(12) United States Patent
Murphy et al.

(10) Patent No.: US 9,079,099 B1
(45) Date of Patent: Jul. 14, 2015

(54) FIRST-PERSON SHOOTER GAMING ACCESSORY

(71) Applicant: Kill Streak Industries LLC, Zeeland, MI (US)

(72) Inventors: Timothy T. Murphy, Zeeland, MI (US); Brandon J. Buckingham, Kalamazoo, MI (US)

(73) Assignee: AIRDROP GAMING, LLC, Zeeland, MI (US)

( * ) Notice: Subject to any disclaimer, the term of this patent is extended or adjusted under 35 U.S.C. 154(b) by 113 days.

(21) Appl. No.: 13/916,721

(22) Filed: Jun. 13, 2013

Related U.S. Application Data

(60) Provisional application No. 61/659,224, filed on Jun. 13, 2012.

(51) Int. Cl.
*A63F 13/00* (2014.01)

(52) U.S. Cl.
CPC ...................................... *A63F 13/00* (2013.01)

(58) Field of Classification Search
USPC ........................................................... 463/47
See application file for complete search history.

(56) References Cited

U.S. PATENT DOCUMENTS

| | | | | |
|---|---|---|---|---|
| 2,665,133 A | * | 1/1954 | Garrido | 463/52 |
| 3,777,410 A | * | 12/1973 | Robinson | 434/323 |
| 4,285,523 A | * | 8/1981 | Lemelson | 463/5 |
| 4,687,918 A | * | 8/1987 | Hughes et al. | 250/205 |
| 6,634,763 B1 | * | 10/2003 | Leifer et al. | 362/109 |
| 2003/0058334 A1 | * | 3/2003 | Boyden et al. | 348/14.08 |
| 2004/0266528 A1 | * | 12/2004 | Wang | 463/37 |
| 2010/0047510 A1 | * | 2/2010 | Couvillion | 428/66.5 |
| 2011/0067622 A1 | * | 3/2011 | Harding | 116/200 |

FOREIGN PATENT DOCUMENTS

| | | | |
|---|---|---|---|
| KR | 20110000460 U | | 1/2011 |
| WO | WO 2009102096 A1 | * | 8/2009 |

OTHER PUBLICATIONS

Headshot Red Dot, Headshot Red Dot Demonstration, https://www.youtube.com/watch?v=50rjhgzTdZg&list=UUgQcsxV2PPi6AwF1GNYpKFw , Feb. 2, 2012, p. 1-3.*
Head Shot Red Dot, http://www.headshotreddot.com, Jun. 12, 2013, 1 page.

* cited by examiner

*Primary Examiner* — Tramar Harper
(74) *Attorney, Agent, or Firm* — McGarry Bair PC (57) ABSTRACT

A gaming accessory for use with a video display used with a target shooting game in which a user shoots targets in a game displayed on the video display includes, among other things, an illuminator positioned with respect to the video display in register with a preselected location of the shots appearing on the video display. Additionally, the gaming accessory has at least one power terminal interconnected with the illuminator and is adapted to be operably interconnected with a power source so that, when the power source is connected to the power terminal, power can be supplied to the illuminator and the illuminator can provide a highly-visible target on the video display to the user.

16 Claims, 13 Drawing Sheets

FIG. 20

FIRST-PERSON SHOOTER GAMING ACCESSORY

CROSS-REFERENCE TO RELATED APPLICATIONS

This application claims the benefit of U.S. Provisional Patent Application No. 61/659,224, filed Jun. 13, 2012, which is incorporated herein by reference in its entirety.

BACKGROUND

First-person shooter games such as Call of Duty and Halo are examples of a popular and growing genre of the video game industry. Generally, a first-person shooter game is an action game centered on firearm and/or other projectile weapon-based combat displayed via the perspective of the gamer's avatar; that is, the in-game character controlled by a user playing the game. In the vast majority of first-person shooter games, the avatar's weapon always fires a projectile whose trajectory converges at the middle of the video display on which the game is being played.

Gamers are very competitive and continuously looking for ways to improve their game performance. It is desirable to improve first-person shooter response time and accuracy when acquiring targets. When playing a game, the gamer needs to react and aim as quickly as possible to "kill or be killed". In most first-person shooter games, the reticle of the existing digital scope or sight may or may not be visible to the gamer depending on the background lighting of the gamer's environment or the avatar's digital environment. For example, with a reticle patterned as a crosshair, if the crosshairs are black and the gamer's avatar is in a dark area of the digital environment of the game, the crosshairs may be washed out and difficult to see, detrimentally affecting the gamer's reaction and accuracy when aiming and shooting at targets.

Figure 1:
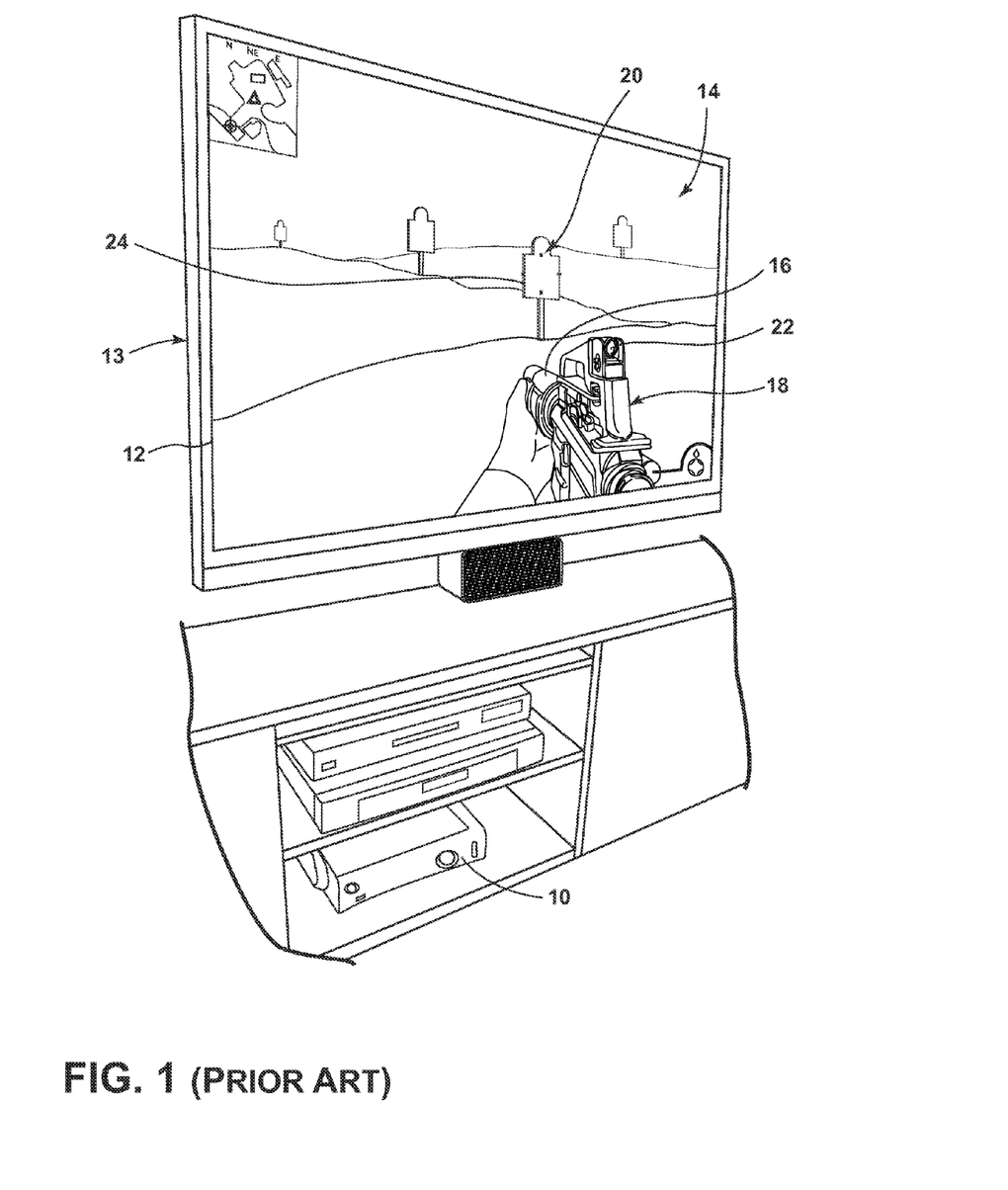
FIG. 1 is a perspective view showing a prior art gaming system comprising a gaming console operably interconnected to a video display and showing a first-person shooter game on the video display.

FIG. 1 is a perspective view showing a prior art gaming system comprising a gaming console 10 operably interconnected to a video display 12 and showing a screenshot of a first-person shooter game 14 on the video display 12. The video display 12 shown herein is provided on a television 13 but could also be provide on other electronic devices, such as a computer display or monitor. FIG. 1 shows a typical scenario when aiming down a barrel 16 of a virtual weapon 18. An in-game reticle 20 of a digital scope or sight 22 may be provided as an indicator to the gamer where the virtual weapon 18 is aimed in the digital environment. For example, as shown in FIG. 1, the virtual weapon 18 is aimed at a shooting target 24.

Figure 2:
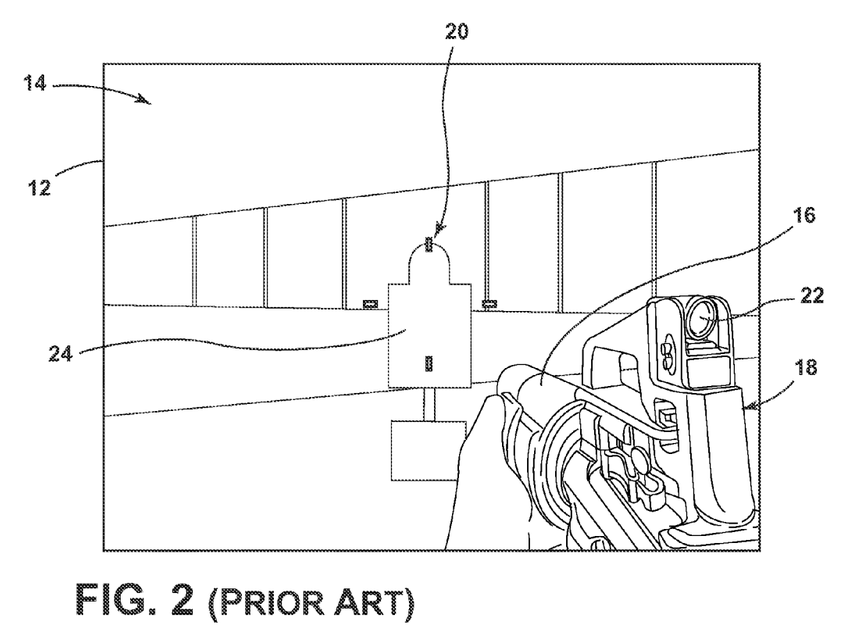
FIG. 2 is a representative screenshot of the example first-person shooting game of FIG. 1, showing the concept that the weapon is aimed at the middle of the video display.

FIG. 2 is a representative screenshot of the example first-person shooting game 14 of FIG. 1, showing the virtual weapon 18 aimed at the middle of the video display 12. FIG. 2 shows that the screenshot and the reticle 20 of the digital sight 22 in the video game are concentric; that is, they share the same center. The center of the video display 12 in most first-person shooter games is the aiming point of the digital sight 22 during the game. In other words, the view through the digital sight 22 would be aligned with the center of the video display 12.

Figure 3:
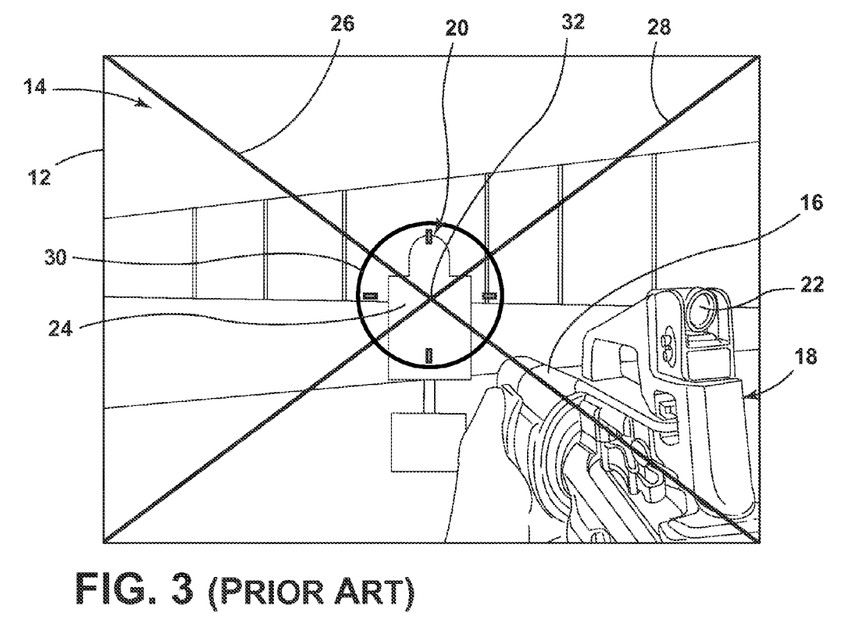
FIG. 3 is a schematic view of FIG. 2 with conceptual illustration lines showing the aiming point of the weapon at the middle of the video display.

FIG. 3 is a schematic view of FIG. 2 with illustration lines 26, 28 conceptually showing the aiming point 32 of the weapon 18 at the middle of the video display 12. A first illustration line 26 is the line segment connecting the upper left corner of the video display 12 with the lower, right corner of the video display 12. A second illustration line 28 is the line segment connecting the upper right corner of the video display 12 with the lower left corner of the video display 12. The intersection 32 of the two illustration lines 26, 28 is located at the center of the video display 12. As shown in FIG. 3, the aiming point represented as the center of the reticle 20 of the digital sight 22 of the weapon 18 is collocated with the intersection 32 at the center of the video display 12. In FIG. 3, the reticle 20 is conceptually represented as a circle 30 surrounding a crosshair pattern. The illustration lines 26, 28 and circle 30 are not actually shown on the video display 12 while playing the first-person shooting game 14; the gamer only sees the view shown in FIG. 2.

In the past, to create a point of reference indicative of the aiming point of their weapon, gamers have used tape, decals, dry-erase markers etc. to create a mark at the center of the video display. One product available on the market, Sticky Sights (http.//www.kooleraireac.com/Sticky_Sights.htm) is a clear static-cling vinyl sticker with a printed crosshair reticle. However, Sticky Sights does not overcome the visibility issues previously attributed to the in-game reticle of a digital scope or sight. Depending upon the video game, Sticky Sights may blend in with the digital environment making the Sticky Sights' crosshairs difficult to see.

BRIEF SUMMARY

The invention relates to a gaming accessory for use with a video display is provided and used with a target shooting game in which a user shoots targets in a game displayed on the video display, wherein the shooting action taken by the user results in shots appearing on the video display in a preselected location thereon. In one embodiment of the invention, the gaming accessory includes an illuminator positioned with respect to the video display in register with the preselected location of the shots appearing on the video display, and at least one power terminal interconnected at a first portion with the illuminator, and having a second portion adapted to be operably interconnected with a power source so that, when the power source is connected at the second portion to the at least one power terminal, power can be supplied to the illuminator and the illuminator can provide a highly-visible target on the video display to the user.

DETAILED DESCRIPTION

The invention relates to a gaming accessory for a game played on a video display. For purposes of description related to the figures, the terms "upper," "lower," "right," "left," "rear," "front," "vertical," "horizontal," and derivatives thereof shall relate to the invention as oriented in FIG. 1 from the perspective of a gamer facing a video display and playing a first-person shooter game shown on the video display. However, it is to be understood that the invention may assume various alternative orientations, except where expressly specified to the contrary.

Figure 4:
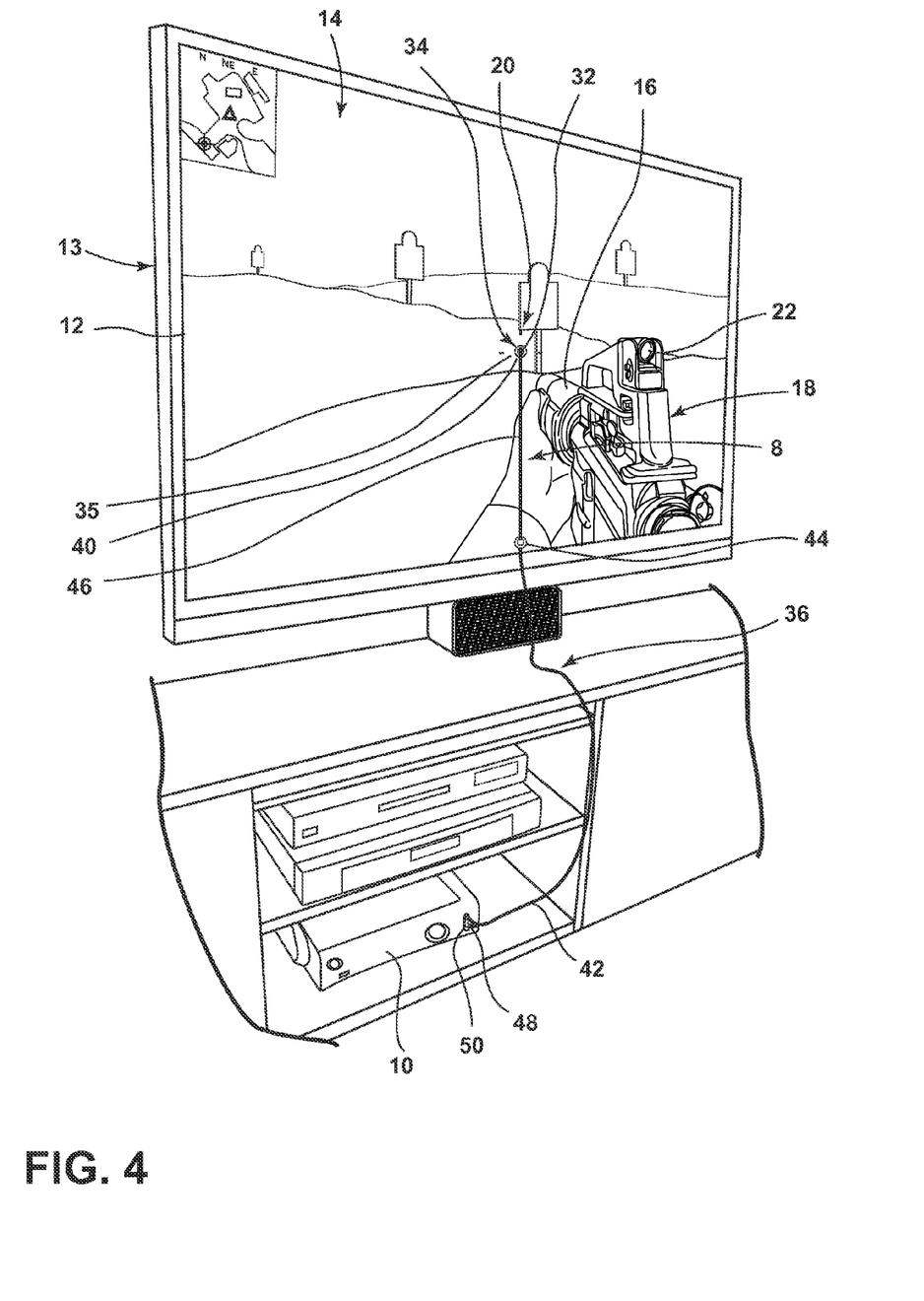
FIG. 4 is a perspective view showing a gaming console interconnected to a video display with a gaming accessory according to a first embodiment of the invention interconnected to the gaming console and having a distal end operably aligned with the target area of the weapon on the first-person shooting game.

FIG. 4 is a perspective view showing a gaming console 10 interconnected to a video display 12 of a television 13 with a gaming accessory 8 according to a first embodiment of the invention interconnected to the gaming console 10 and having a distal end operably aligned with the aiming point or target area of the weapon 18 on the first-person shooting game 14. The aiming point or target area of the weapon 18, as shown by the in-game crosshair pattern reticle 20 of a digital sight 22, may preferably be the center 32 of the video display 12 but may be at any preselected location on the video display 12 where the shooting action taken by the user results in the appearance of shots fired by the virtual weapon 18. The gaming accessory 8 consists of an illuminator 34 that is positioned with respect to the video display 12 in register with the preselected location of the shots appearing in the video display 12 and a power terminal 36 to supply power to the illuminator 34 such that the illuminator 34 may provide a highly-visible target 35 on the video display 12. The power terminal 36 may further include a primary power lead 42 coupled to a secondary power lead 46.

Figure 5:
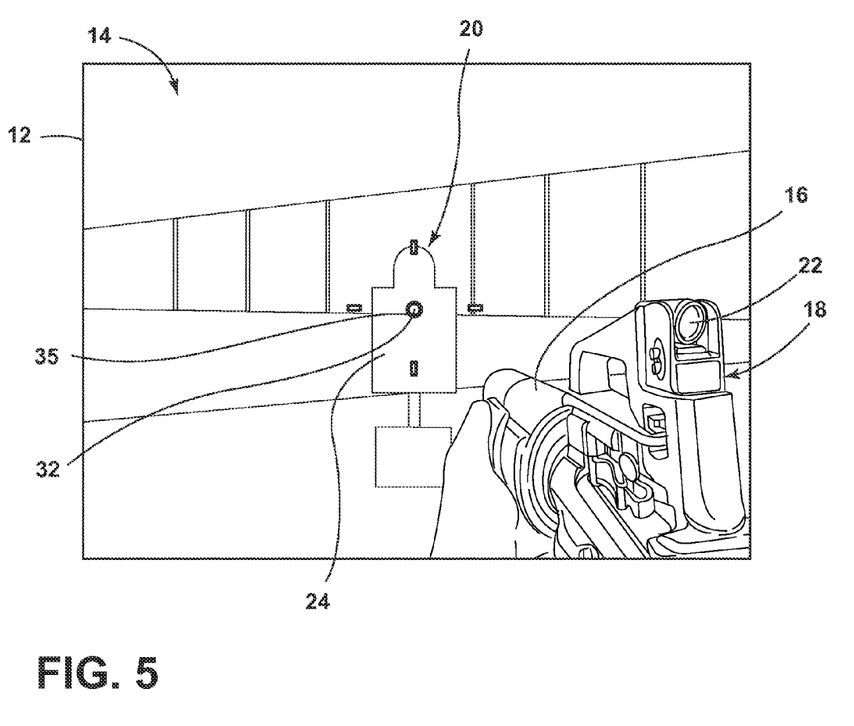
FIG. 5 is a screenshot of the example first-person shooting game showing the display augmented with the gaming accessory described and shown with respect to FIG. 4.

FIG. 5 is a screenshot of the example first-person shooting game 14 showing the video display 12 augmented with the gaming accessory 8 described and shown with respect to FIG. 4. At the center 32 of the video display 12, the highly-visible target 35 as provided by the gaming accessory 8 may be co-aligned with the aiming point, as shown by the crosshair pattern reticle 20 of the digital sight 22 of the virtual weapon 18 whose aiming point is at the in-game shooting target 24.

Figure 6:
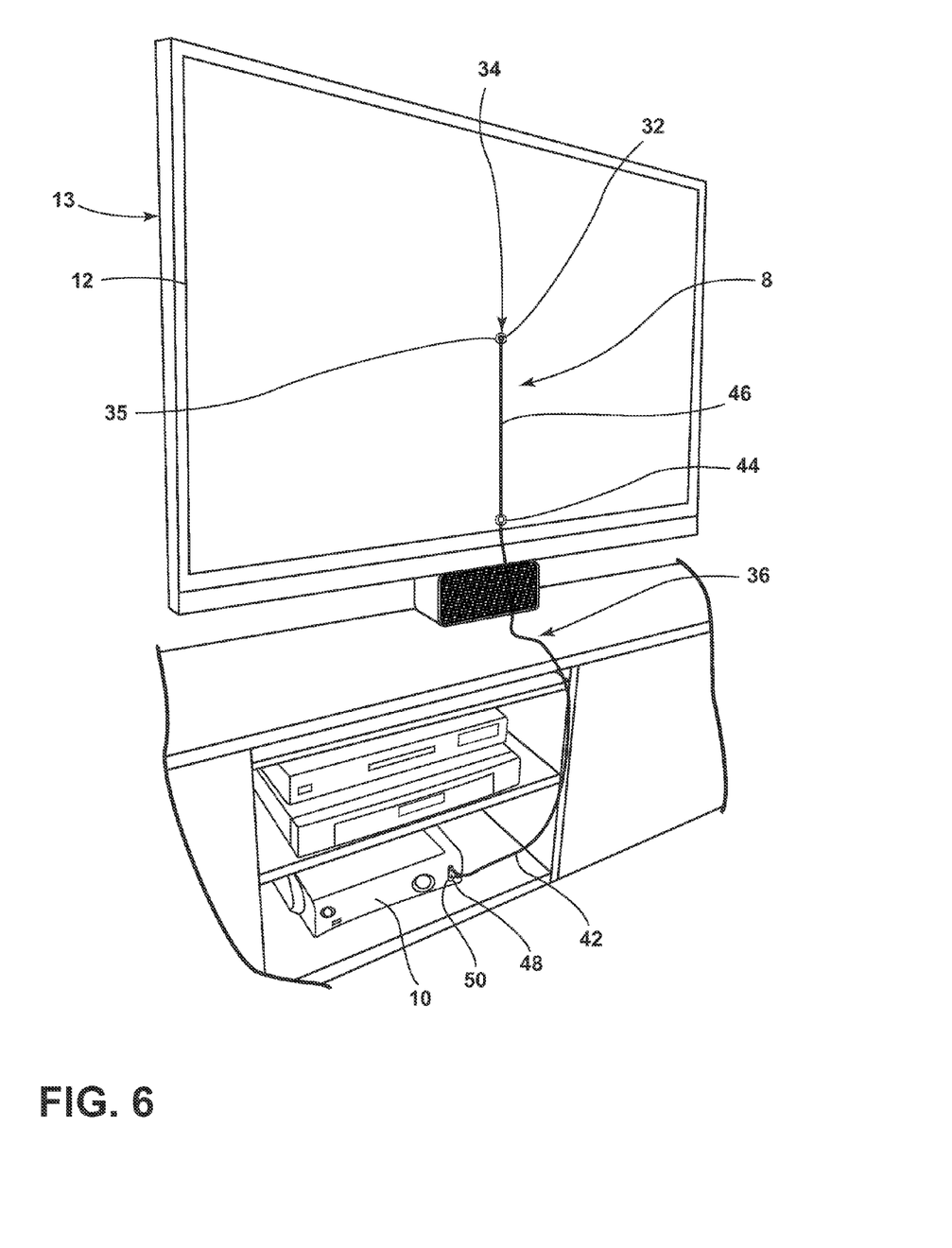
FIG. 6 is a perspective view similar in orientation to that shown in FIG. 4, without the first-person shooting game on the display to show the assembly and alignment of the gaming accessory.

FIG. 6 is a perspective view similar in orientation to that shown in FIG. 4, without the first-person shooting game on the video display to show the assembly and alignment of the gaming accessory of FIGS. 4-5 according to the invention.

Figure 7:
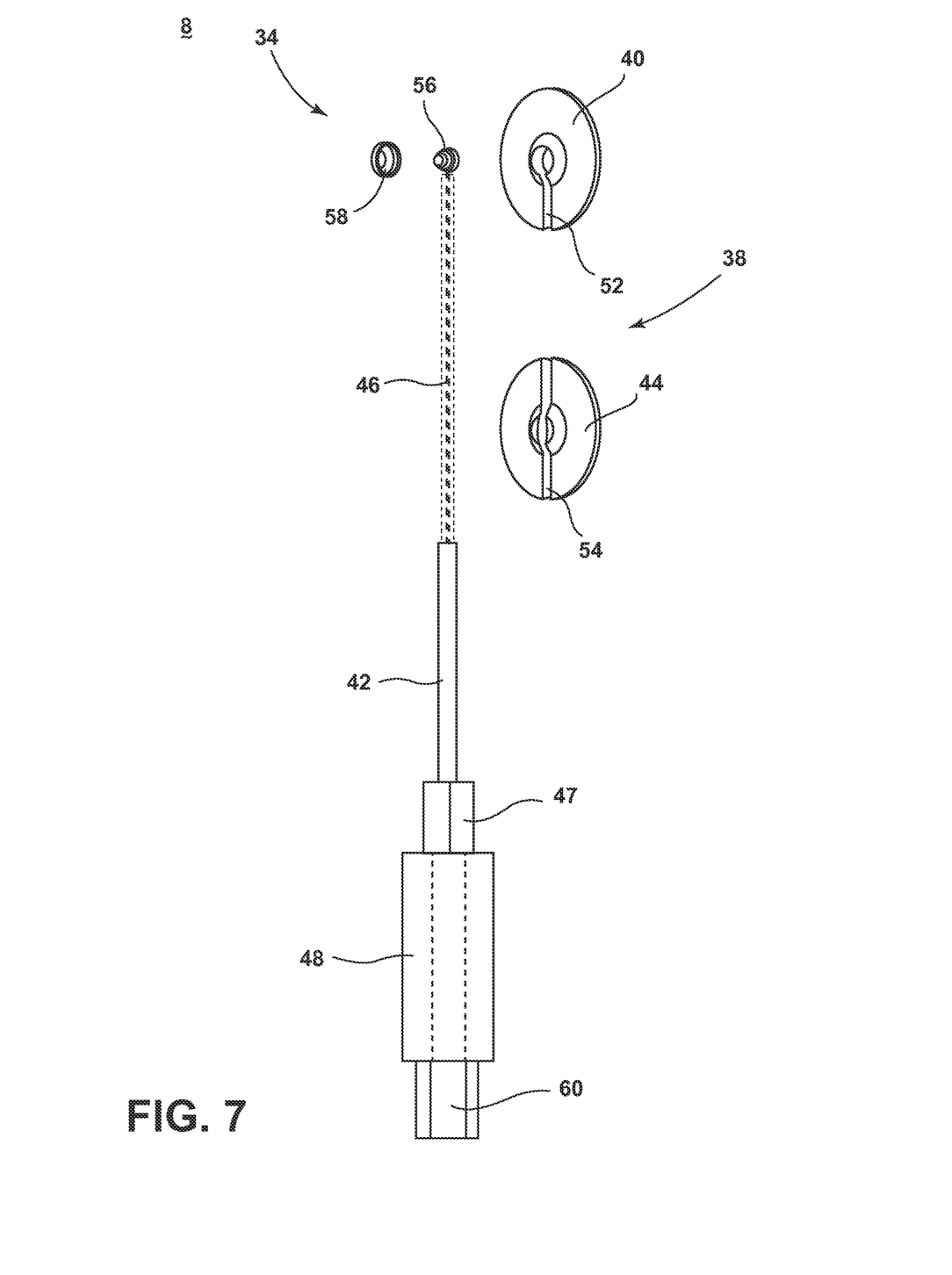
FIG. 7 is an exploded view of the gaming accessory shown in FIG. 4.

Referring to FIG. 7, the gaming accessory 8 may further include an illuminator retainer 38 configured to mount the illuminator 34 to the video display 12. The illuminator retainer 38 may include a first suction cup 40 embedded with the illuminator 34, shown as an LED 56 with a lens 58, connected by the secondary power lead 46 to a second suction cup 44. Each suction cup 40, 44 may additionally include an aperture 52, 54 through which a portion of the power cord such as the secondary power lead 46 may be routed. The aperture 52 of the first suction cup 40 may be a single channel extending radially from the center of the first suction cup 40. A portion of the secondary power lead 46 coupled to the LED 56 may be routed through the aperture 52 for wire management of the power cord. Similarly, the secondary power lead 46 may be routed through the aperture 54 of the second suction cup 44 where the aperture 54 may extend across the diameter of the second suction cup 44.

The secondary power lead 46 may then be coupled to the primary power lead 42. Via an integrally molded cable strain relief mechanism 47, the primary power lead 42 may be coupled to a housing 48. The housing 48 may be coupled to a port 60 for connection to an external power source 50 such as may be provided by a gaming console. The port 60 may be formed as to enable connection to one of many common power sources. The port 60 may be a USB Type A plug for connection into a USB port though other connections may include configurations for coupling to a wall outlet or a battery pack.

When powered, the illuminator 34 may provide a highly-visible target on the video display 12. Though any light source may be used, the illuminator 34 may preferably include an LED 56 or similar semiconductor light source. Other light sources may include, for example, a laser pointer or any other light source capable of generating a highly-visible target.

The illuminator 34 may include a plurality of LEDs having at least two LEDs that may emit distinct colors or a single multi-color LED. The housing 48 may further include a controller for changing the color emitted by the illuminator 34 may have a manual switch to allow a user to set the color emitted by the LEDs. Alternatively, with additional sensor feedback, the controller may automatically select the emitted color based on environmental conditions such as lighting in either the user's environment or the in-game digital environment.

The primary power lead 42 can be an assembly of electrical conductors held together with a sheath for the purpose of transmission of electrical power from a power source to elements of the gaming accessory, including the illuminator 34. Though it may be of any length, the primary power lead 42 may be implemented as a six-foot power cord. Similarly, the secondary power lead 46 is a power cord but is preferably constructed to be thin to provide the least visual obstruction of the video display 12. Though any length may be used and may preferably be selected based on the dimensions of the video display 12, a 24-inch power cord is preferred.

The second suction cup 44 may be configured to hold the secondary power lead 46 directed from the first suction cup 40 parallel to the video display 22 and vertical. In this way, the second suction cup 44 acts as a tension control device for the secondary power lead 46 and removes slack in the secondary power lead 46 from the first suction cub 40 to the perimeter of the video display 12.

Though a transparent suction cup approximately 20 mm in diameter embedded with a 3 mm diameter LED in the center may be preferred, other suction cups of varying size, color and transparency may be used in tandem with many different configurations of LEDs for the illuminator retainer and illuminator.

Referring back to FIG. 4, a user of the gaming accessory 8 may preferably install the gaming accessory 8 by, initially, starting a first person shooter game on the gaming console 10. Then, the user presses the first suction cup 40 with the embedded LED to the aiming point of the weapon for the initial alignment of the gaming accessory 8. The user then presses the second suction cup 44 at the peripheral edge of the video display 12 of the television 13 to guide and hold tension on the secondary power lead 46. Then, the user plugs the primary power lead 42 from the second suction cup 44 into the external power source 50, such as a USB connection of the gaming console 10, to generate the highly-visible target 35.

Figure 8:
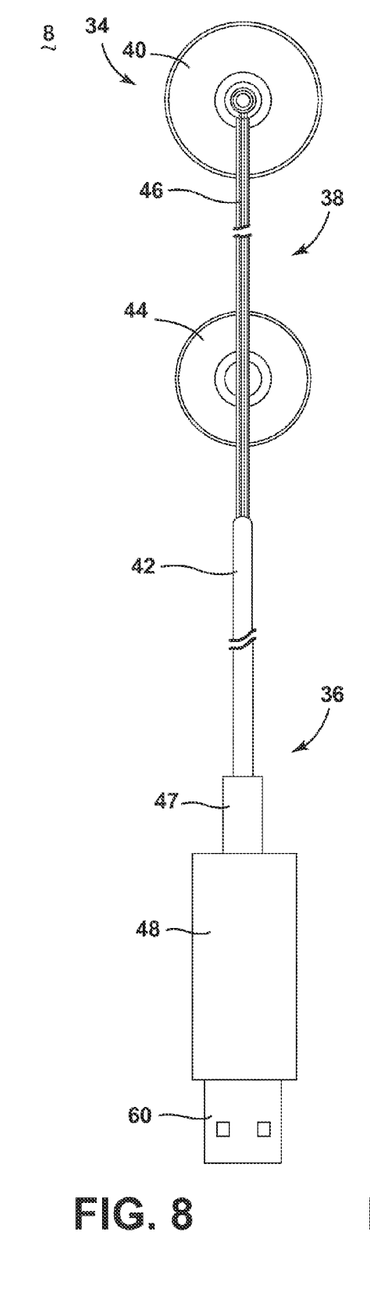
FIG. 8 is a front elevational view of the gaming accessory shown in FIG. 4.
Figure 9:
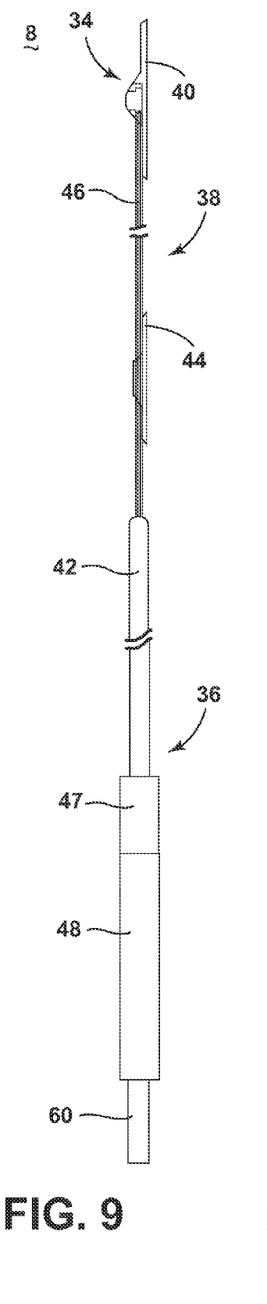
FIG. 9 is a side elevational view of the gaming accessory shown in FIG. 4, in which attachment retainers of the gaming accessory are shown in a flattened position.
Figure 10:
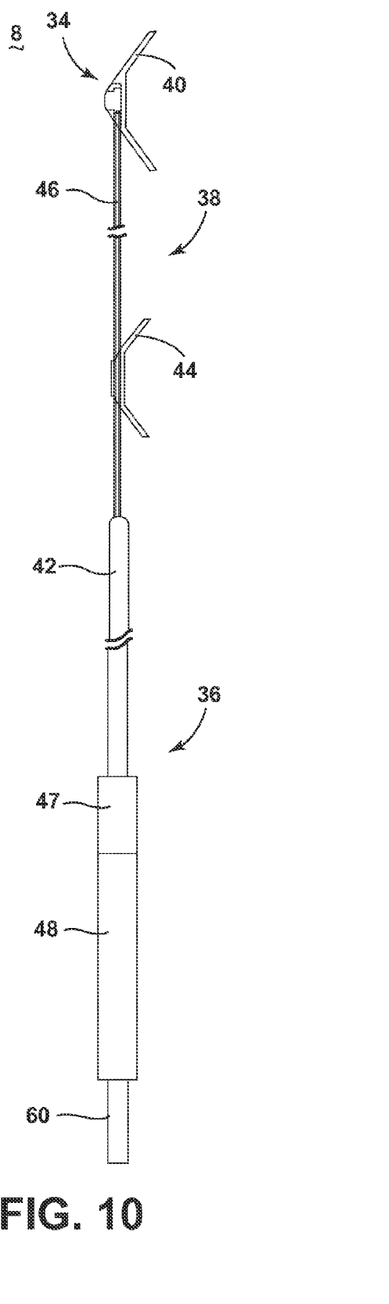
FIG. 10 is a side elevational view similar to FIG. 9, in which attachment retainers of the gaming accessory are shown in an un-flattened position.

FIGS. 8-10 are front and side elevational views of the gaming accessory 8 shown in FIGS. 4-6. FIG. 9 illustrates the suction cups 40, 44 in a flattened position as they would be when attached to the video display 12. FIG. 10 shows the suction cups 40, 44 in an unflattened position as they would be when detached from the video display 12. In this way, FIGS. 9 and 10 demonstrate the attached and detached configurations of the suction cups 40, 44 of the gaming accessory 8 for connection to the video display 12.

Figure 11:
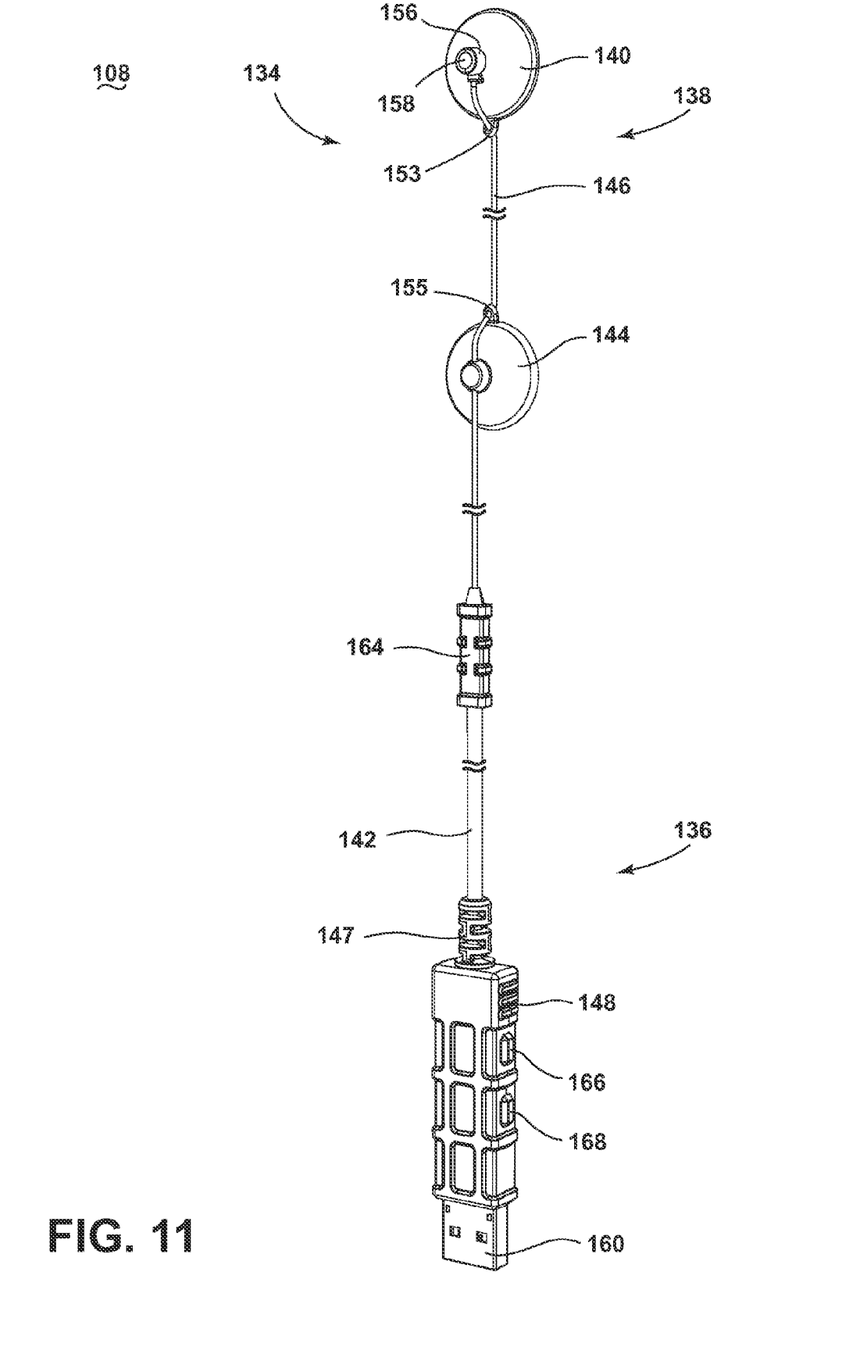
FIG. 11 is a perspective view of a gaming accessory according to a second embodiment the invention.

FIG. 11 is a perspective view of a gaming accessory according to a second embodiment of the invention. The elements of the gaming accessory may be similar to the elements of the gaming accessory described above; therefore, like parts will be identified with like numerals beginning with 100, with it being understood that the description of the like parts applies to the alternative configuration of the gaming accessory elements, unless otherwise noted. Additional embodiments will employ the same convention where like numerals beginning with 200, 300, etc. will identify like parts of the alternative configurations of the gaming accessory.

The first suction cup 140 may be configured to encompass the illuminator 134 where the illuminator 134 is shown as an LED 156 on a printed circuit board (PCB), and a lens 158. Instead of being fed through an aperture in the suction cup, the secondary power lead 146 coupled to the LED 156 by the PCB may be fed through a peripheral tab 153 constructed as an annular element attached or integrally molded to the periphery of the first suction cup 140. Additionally, the secondary power lead 146 may be fed through a second peripheral tab 155 also constructed as an annular element attached or integrally molded to the periphery of the second suction cup 144. In this way, the peripheral tabs 153, 155 may not only provide a means to manage the placement and tension of the secondary power lead 146, but also a way to quickly detach the gaming accessory 108 from the video display. To detach the gaming accessory 108, a user may pull on the secondary power lead 146 or the primary power lead 142 to break a pressure seal between the suction cups 140, 144 and the video display of the television or monitor. A lead coupler 164 acts as the transition between the secondary power lead 146 and the primary power lead 142, and may provide wire tension relief between the power leads 142, 146.

Figure 12:
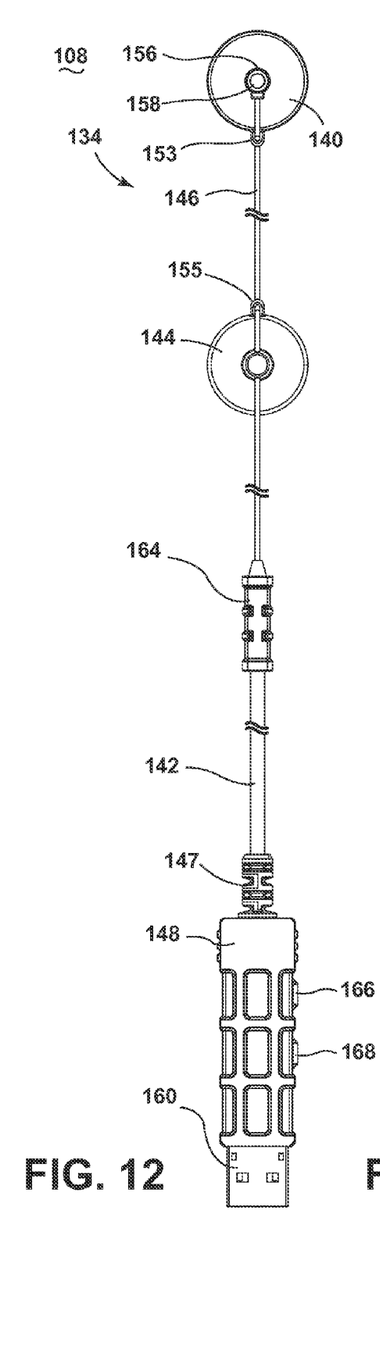
FIG. 12 is a front elevational view of the gaming accessory shown in FIG. 11.
Figures 13, 14:
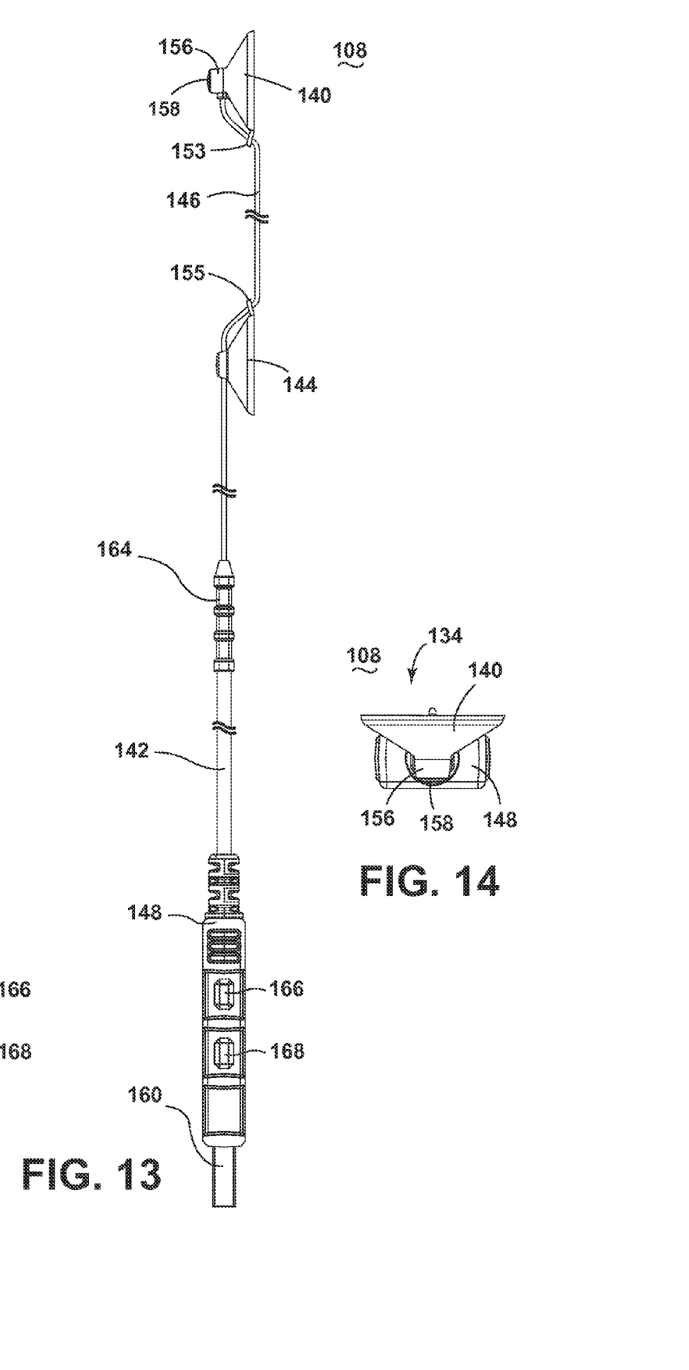
FIG. 13 is a side elevational view of the gaming accessory shown in FIG. 11.
FIG. 14 is a top plan view of the gaming accessory shown in FIG. 11.

The housing 148 may include may include a first control button 166 for adjusting the brightness of the illuminator 134 and a second control button 168 for selecting the color of the light emitted by the illuminator 134. The user may activate the buttons 166, 168 to toggle between states. For example, the user may select the first control button 166 multiple times to toggle the brightness of the illuminator 134 between three states indicative of the intensity of the emitted light. Or, the user may select the second control button 168 multiple times to toggle the color of the illuminator 134 between red, green and blue outputs. The buttons 166, 168 may be electromechanical or touch-based, depending upon the implementation. Also, depending upon the implementation, the buttons 166, 168 may be configured to act as push buttons or switches or sliders. Any number of additional controls and buttons may be integrated into the housing 148 depending upon the implementation. FIGS. 12-14 are front elevational, side elevational, and top plan views of the gaming accessory 108 shown in FIG. 11.

Figure 15A:
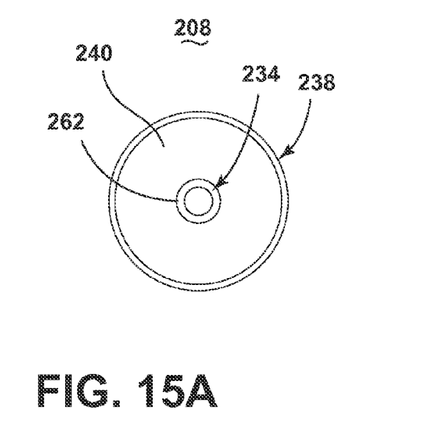
FIG. 15A is a front elevational view of a gaming accessory according to a third embodiment of the invention.
Figure 15B:
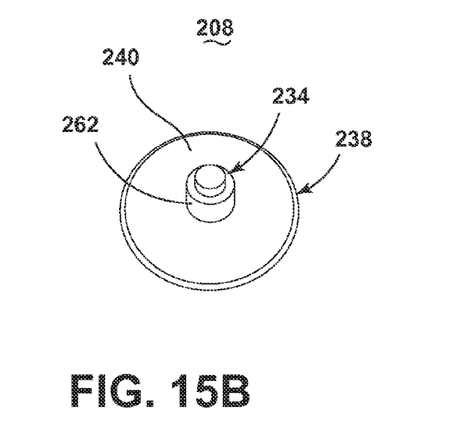
FIG. 15B is a perspective view of the gaming accessory shown in FIG. 15A.
Figure 15C:
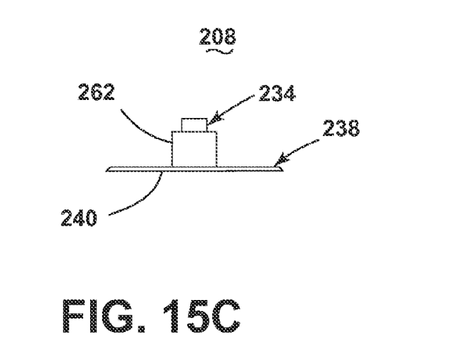
FIG. 15C is a top plan view of the gaming accessory shown in FIG. 15A.
Figure 16:
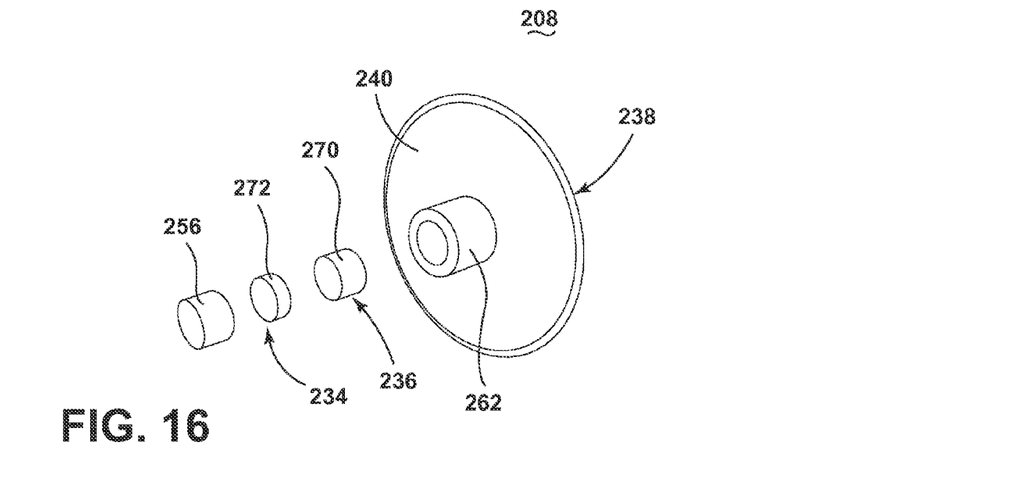
FIG. 16 is an exploded view of the gaming accessory shown in FIG. 15A.

FIGS. 15A-16 show a gaming accessory 208 according to a third embodiment of the invention. FIGS. 15A-C and FIG. 16 are front elevational, perspective, top plan and exploded views of the gaming accessory 208. A wireless implementation of the gaming accessory 208 may include an illuminator retainer 238, an illuminator 234 and a power terminal 236. The illuminator retainer 238 may further include a single suction cup 240 and a housing 262. The illuminator 234 may further include an LED 256 and a PCB 272. The power terminal 236 may further include a battery 270. The housing 262, preferably constructed by integrally molded the housing into the suction cup 240, may support the battery 270, the PCB 272 and the LED 256. The battery 270 and the LED 256 may then be coupled by the PCB 272 where the PCB 272 further includes the electronic components necessary to direct power from the battery 270 to the LED 256 to illuminate the LED 256 to produce a highly-visible target. The PCB 272 may include additional controls to affect the brightness and color of the LED 256.

Figure 17A:
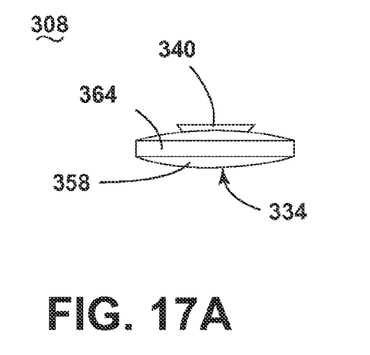
FIG. 17A is a top plan view of a gaming accessory, according to a fourth embodiment the invention.
Figure 17B:
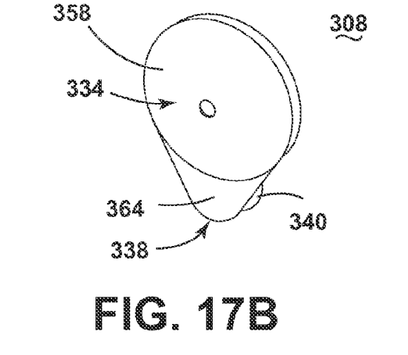
FIG. 17B is a perspective view of the gaming accessory shown in FIG. 17A.
Figure 17C:
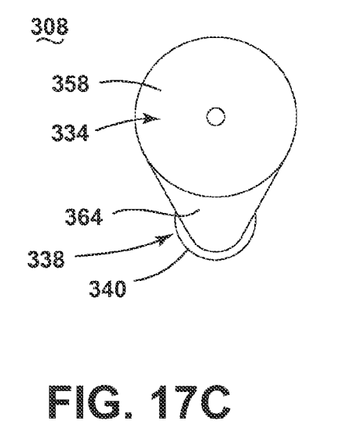
FIG. 17C is a front elevational view of the gaming accessory shown in FIG. 17A.
Figure 17D:
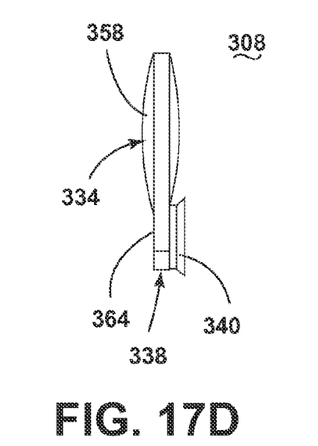
FIG. 17D is a side elevational view of the gaming accessory shown in FIG. 17A.
Figure 18:
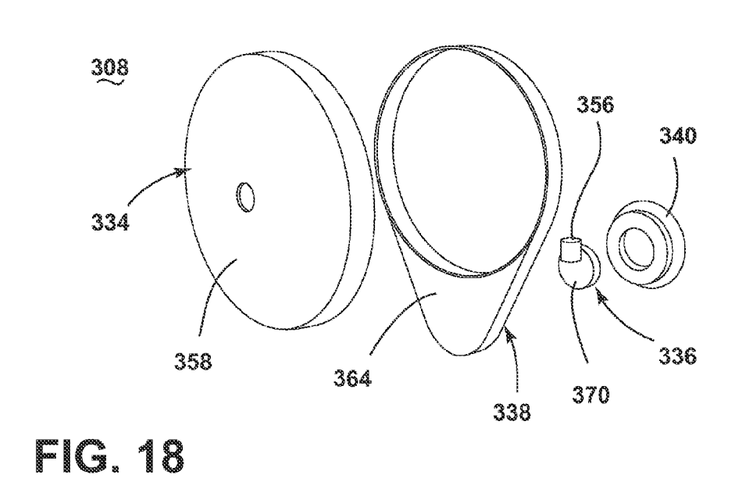
FIG. 18 is an exploded view of the gaming accessory shown in FIG. 17A.

FIG. 17A-18 show a gaming accessory 308 according to a fourth embodiment of the invention. FIGS. 17A-D and FIG. 18 are top plan, perspective, front elevational, side elevational and exploded views of the gaming accessory 308. A second wireless implementation of the gaming accessory 308 may include an illuminator retainer 338, an illuminator 334 and a power terminal 336. The illuminator retainer 338 may further include a single suction cup 340 and a housing 364. The illuminator 334 may further include an LED 356 and a lens 358. The power terminal 336 may further include a battery 370. The housing 364 may support the battery 370 and the LED 356 on one side and the lens 358 on the other. The battery 370 and the LED 356 may then be coupled inside the suction cup 340. The lens 358, the LED 356 and the housing 364 may preferably be configured such that the housing 364 and the lens 358 form a light guide to generate edge-lit illumination that produces a highly-visible target. Additionally, the lens 358 may be formed as a convex lens to produce a magnified image of the target area of the virtual weapon on the video display. The gaming accessory 308 may additionally include a PCB (not shown) to provide additional controls to affect the brightness and color of the LED 356.

Figure 19:
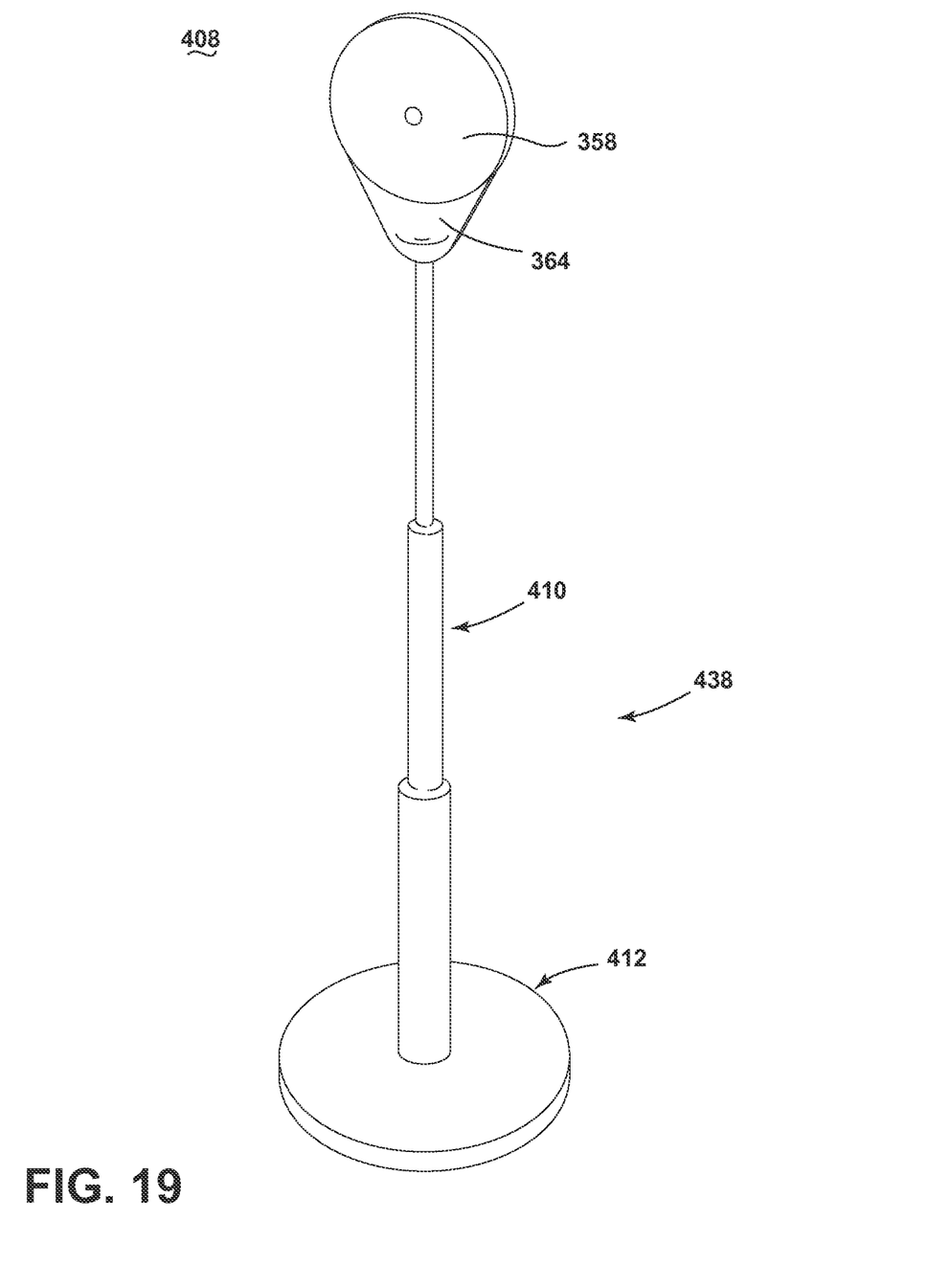
FIG. 19 is a perspective view of a gaming accessory according to a fifth embodiment of the invention.

FIG. 19 is a perspective view of a gaming accessory 408 according to a fifth embodiment of the invention. Similar to the gaming accessory 308 described in FIGS. 17 and 18, an edge-lit illuminated lens 358 and housing 364 may support and act as a light guide for an LED 356. Instead of employing suction cups or other devices for direct connection to the video display, the illuminator retainer 438 may further include a freestanding base 412 with a height adjustable, telescoping arm 410. Though power may be applied by a battery contained in the housing 364 as described above, power may also be supplied from an external power source such as USB port, a wall outlet or a battery coupled to a power cord contained in the freestanding base 412. In this configuration, power may be supplied through the height adjustable telescoping arm 410.

Figure 20:
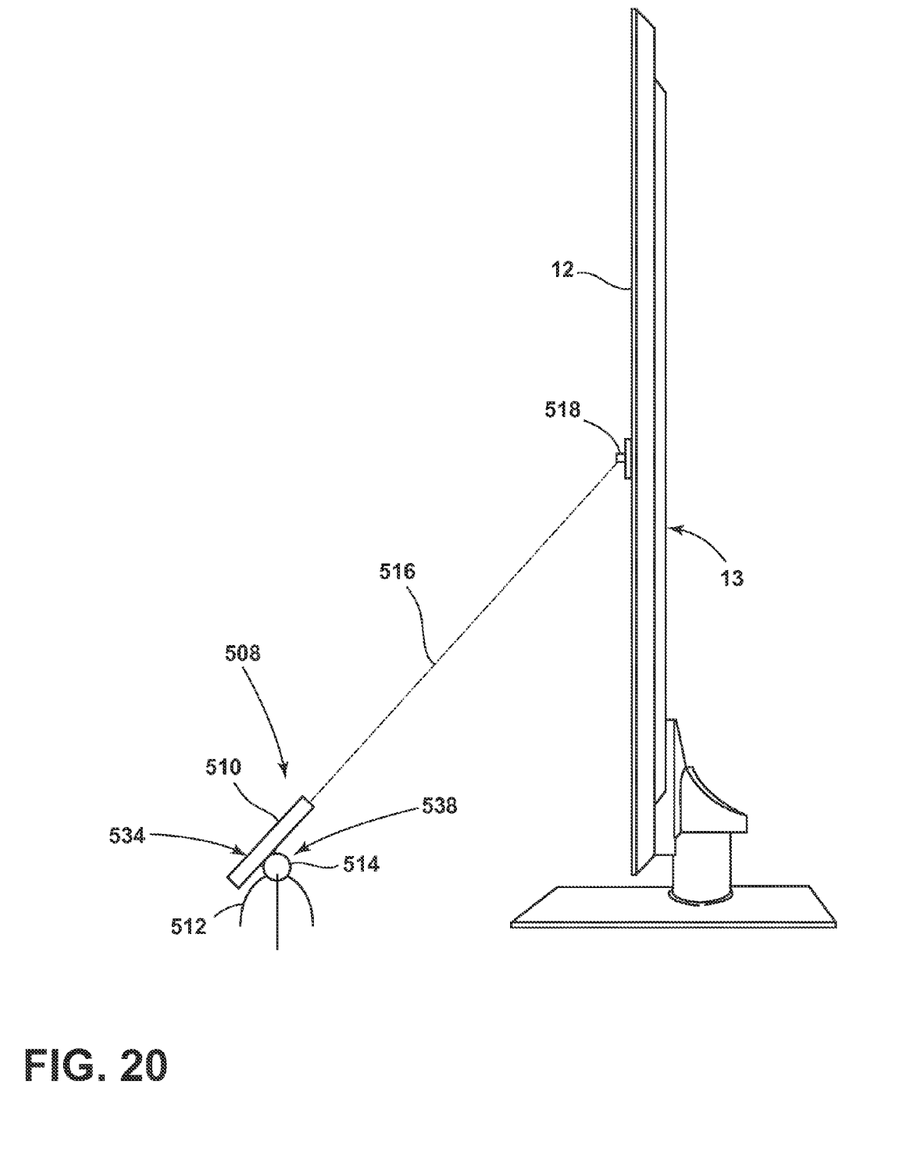
FIG. 20 is a side elevational schematic view of a gaming accessory according to a sixth embodiment of the invention.

FIG. 20 is a side elevational schematic view of a gaming accessory 508 according to a sixth embodiment of the invention. The illuminator 534 may include a laser pointer device 510, a laser beam 516 and a diffusing deflector 518. The illuminator retainer 538 may include an adjustable tripod type mount 512 and at least one pivoting connection 514. The laser pointer device 510 may be mounted to the adjustable tripod type mount 512 with at least one pivoting connection 514. The laser pointer device 510 may be placed in front of the television 13 and may direct a laser beam 516 towards the small, diffusing deflector 518 adhered to the video display 12 of the television 13. The deflector 518 may include a suction cup or other device or material with qualities conducive to adherence to the video display 12. The laser pointer device 510 may be powered by a power terminal (not shown) that may include an external power source such as a USB port or a wall outlet or a battery.

In summary, the invention relates to a highly-visible illuminated point of reference or target for the gamer's television or monitor. The invention enables gamers to acquire targets faster and more accurately, thus improving their response time, accuracy and overall gaming experience. The target is easily installed or removed and utilizes a power source such as the USB power available on most gaming consoles or computers. The target may include a powered LED housed in a suction cup. Because the invention is illuminated and clearly visible at all times, the gamer experiences increased reaction times and accuracy while playing first-person shooter games.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly disclosed.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A gaming accessory for use with a video display used with a target shooting game in which a user shoots targets in a game displayed on the video display, wherein the shooting action taken by the user results in shots appearing on the video display in a preselected location thereon, the gaming accessory comprising:
   an illuminator positioned with respect to the video display in register with the preselected location of the shots appearing on the video display;
   an illuminator retainer configured to mount the illuminator to the video display at the preselected location of the shots appearing on the video display in connection with the game;
   at least one power terminal interconnected at a first portion with the illuminator, and at a second portion configured to be interconnected with a power source so that, when the power source is connected at the second portion to the at least one power terminal, power can be supplied to the illuminator and the illuminator can provide a highly-visible target on the video display to the user.

2. The gaming accessory of claim 1 wherein the illuminator retainer comprises a first suction cup for mounting in register over the preselected location of the shots appearing on the video display in connection with the game.

3. The gaming accessory of claim 2 wherein the suction cup is transparent.

4. The gaming accessory of claim 1 wherein the illuminator comprises a plurality of LEDs having at least two distinct colors in the plurality of LEDs, and further comprising a controller for changing the color emitted by the plurality of the LEDs.

5. The gaming accessory of claim 4 wherein the controller has a switch associated therewith that allows a user to set the color emitted by the plurality of LEDs.

6. A gaming accessory for use with a video display used with a target shooting game in which a user shoots targets in a game displayed on the video display, wherein the shooting action taken by the user results in shots appearing on the video display in a preselected location thereon, the gaming accessory comprising:
   an illuminator positioned with respect to the video display in register with the preselected location of the shots appearing on the video display;
   at least one power terminal interconnected at a first portion with the illuminator, and having a second portion adapted to be operably interconnected with a power source so that, when the power source is connected at the second portion to the at least one power terminal, power can be supplied to the illuminator and the illuminator can provide a highly-visible target on the video display to the user;
   an illuminator retainer configured to mount the illuminator to the video display at the preselected location of the shots appearing on the video display in connection with the game
   wherein the illuminator retainer comprises a first suction cup for mounting in register over the preselected location of the shots appearing on the video display in connection with the game;
   wherein the suction cup includes an edge illuminator around the periphery thereof.

7. A gaming accessory for use with a video display used with a target shooting game in which a user shoots targets in a game displayed on the video display, wherein the shooting action taken by the user results in shots appearing on the video display in a preselected location thereon, the gaming accessory comprising:
   an illuminator positioned with respect to the video display in register with the preselected location of the shots appearing on the video display, the illuminator comprising:
      an LED;

a suction cup for retaining the LED on the video display at the preselected location of the shots appearing on the video display in connection with the game;

a battery contained within the suction cup;

at least one power terminal interconnected at a first portion with the illuminator, and at a second portion configured to be interconnected with a power source so that, when the power source is connected at the second portion to the at least one power terminal, power can be supplied to the illuminator and the illuminator can provide a highly-visible target on the video display to the user;

wherein the at least one power terminal interconnected with the LED is operably interconnected with the battery via the at least one power terminal.

8. A gaming accessory for use with a video display used with a target shooting game in which a user shoots targets in a game displayed on the video display, wherein the shooting action taken by the user results in shots appearing on the video display in a preselected location thereon, the gaming accessory comprising:

an illuminator positioned with respect to the video display in register with the preselected location of the shots appearing on the video display;

at least one power terminal interconnected at a first portion with the illuminator, and at a second portion configured to be interconnected with a power source so that, when the power source is connected at the second portion to the at least one power terminal, power can be supplied to the illuminator and the illuminator can provide a highly-visible target on the video display to the user;

an illuminator retainer configured to mount the illuminator to the video display at the preselected location of the shots appearing on the video display in connection with the game;

wherein the illuminator retainer comprises a first suction cup for mounting in register over the preselected location of the shots appearing on the video display in connection with the game and a second suction cup for mounting to a portion of the video display distal from the first suction cup.

9. The gaming accessory of claim 8 further comprising a game console with at least one port adapted to be interconnected with the power terminal associated with the illuminator.

10. The gaming accessory of claim 9 wherein the illuminator comprises at least one LED.

11. The gaming accessory of claim 9 wherein the at least one power terminal has a power cord mounted thereto and the power cord has a plug at an opposite end thereof adapted to be received by the port on the gaming console.

12. The gaming accessory of claim 11 wherein the power cord is at least six feet long.

13. The gaming accessory of claim 11 wherein the second suction cup comprises at least one cord retainer adapted for receiving a portion of the power cord for wire management of the power cord between the first suction cup and the port on the gaming console.

14. The gaming accessory of claim 11 wherein at least one of the first suction cup or the second suction cup comprises at least one peripheral tab adapted to release the suction cup when mounted to the video display.

15. The gaming accessory of claim 14 wherein the at least one peripheral tab further comprises an aperture through which a portion of the power cord can be routed for wire management of the power cord.

16. The gaming accessory of claim 11 wherein the plug at an opposite end of the power cord comprises a USB plug.

* * * * *